(12) United States Patent
Dajnowicz

(10) Patent No.: US 6,753,944 B1
(45) Date of Patent: Jun. 22, 2004

(54) TECHNIQUE FOR CHARACTERIZING THE PERFORMANCE OF AN OBJECT POSITIONING APPARATUS

(75) Inventor: Jonathan F. Dajnowicz, Lakeville, MN (US)

(73) Assignee: Cypress Semiconductor Corporation, San Jose, CA (US)

( * ) Notice: Subject to any disclaimer, the term of this patent is extended or adjusted under 35 U.S.C. 154(b) by 15 days.

(21) Appl. No.: 10/231,551

(22) Filed: Aug. 30, 2002

(51) Int. Cl.[7] .................. G03B 27/32; G03B 27/42; G03B 27/58
(52) U.S. Cl. ............................. 355/53; 72/77
(58) Field of Search .................... 355/52, 53, 55, 355/77; 356/399, 400, 401

(56) References Cited

U.S. PATENT DOCUMENTS

| 6,473,159 B1 | * | 10/2002 | Wakui et al. ............. 355/53 |
| 6,600,985 B2 | * | 7/2003 | Weaver et al. ............ 701/45 |
| 2003/0141439 A1 | * | 7/2003 | Heminger et al. ........ 250/221 |

\* cited by examiner

Primary Examiner—Alan Mathews
(74) Attorney, Agent, or Firm—Okamoto & Benedicto LLP

(57) ABSTRACT

In one embodiment, an object positioning apparatus is characterized by receiving sensor data from a sensor, processing the sensor data to compensate for sensor drift, and analyzing the resulting processed sensor data to determine a characteristic of the apparatus. Compensating for sensor drift cleans up the sensor data so that they may be properly analyzed and compared against known good sensor data, for example.

20 Claims, 7 Drawing Sheets

FIG. 7-B

| Datapoint | Z axis Position |
|---|---|
| 1 | -0.031 |
| 2 | -0.004 |
| 3 | -0.011 |
| 4 | -0.019 |
| 5 | -0.01 |
| 6 | -0.039 |
| 7 | -0.043 |
| 8 | -0.027 |
| 9 | -0.016 |
| 10 | -0.032 |
| 11 | -0.008 |
| 12 | -0.027 |
| 13 | -0.01 |
| 14 | -0.035 |
| 15 | -0.003 |
| 16 | -0.009 |
| 17 | -0.018 |
| 18 | -0.007 |
| 19 | -0.007 |
| 20 | -0.022 |
| 21 | -0.025 |
| 22 | -0.01 |
| 23 | -0.008 |
| 24 | 0.004 |
| 25 | -0.008 |
| 26 | -0.011 |
| 27 | -0.01 |
| 28 | -0.008 |
| 29 | -0.016 |
| 30 | -0.037 |
| .....500 | |

| Datapoint | Z axis Position |
|---|---|
| 1 | -0.0177 |
| 2 | 0.0093 |
| 3 | 0.0022 |
| 4 | -0.0058 |
| 5 | 0.0031 |
| 6 | -0.0259 |
| 7 | -0.0300 |
| 8 | -0.0140 |
| 9 | -0.0031 |
| 10 | -0.0191 |
| 11 | 0.0048 |
| 12 | -0.0143 |
| 13 | 0.0027 |
| 14 | -0.0224 |
| 15 | 0.0096 |
| 16 | 0.0035 |
| 17 | -0.0055 |
| 18 | 0.0054 |
| 19 | 0.0054 |
| 20 | -0.0097 |
| 21 | -0.0127 |
| 22 | 0.0022 |
| 23 | 0.0042 |
| 24 | 0.0161 |
| 25 | 0.0041 |
| 26 | 0.0010 |
| 27 | 0.0019 |
| 28 | 0.0039 |
| 29 | -0.0042 |
| 30 | -0.0252 |
| .....500 | |

| Frequency (Hz) | FFT value |
|---|---|
| 1 | 0.0211944 |
| 2 | 0.0285264 |
| 3 | 0.0207421 |
| 4 | 0.0134818 |
| 5 | 0.0194436 |
| 6 | 0.0128078 |
| 7 | 0.0186946 |
| 8 | 0.0057102 |
| 9 | 0.0046711 |
| 10 | 0.0116943 |
| 11 | 0.0117275 |
| 12 | 0.0013274 |
| 13 | 0.0153171 |
| 14 | 0.010508 |
| 15 | 0.0176924 |
| 16 | 0.0069496 |
| 17 | 0.0137127 |
| 18 | 0.0138331 |
| 19 | 0.0120053 |
| 20 | 0.010206 |
| 21 | 0.0268123 |
| 22 | 0.0108733 |
| 23 | 0.0316066 |
| 24 | 0.0201778 |
| 25 | 0.0140169 |
| 26 | 0.0149384 |
| 27 | 0.0187407 |
| 28 | 0.0268123 |
| 29 | 0.0108733 |
| 30 | 0.0316066 |
| ....250 | |
FIG. 9A
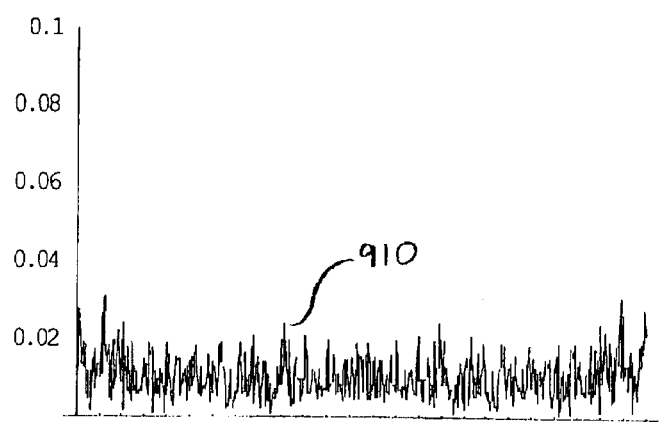
FIG. 9B
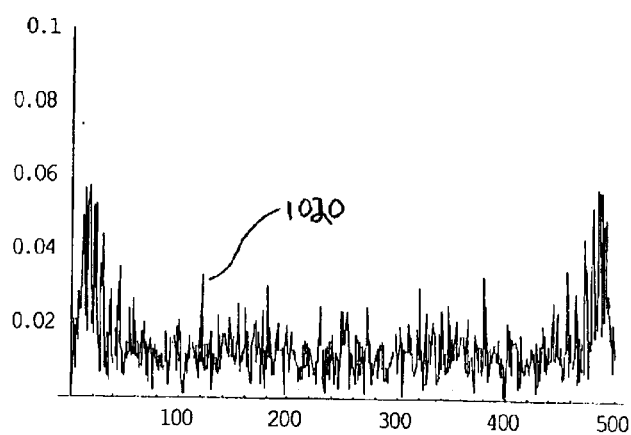
FIG. 10

TECHNIQUE FOR CHARACTERIZING THE PERFORMANCE OF AN OBJECT POSITIONING APPARATUS

BACKGROUND OF THE INVENTION

1. Field of the Invention

The present invention relates generally to apparatus for positioning objects, and more particularly, but not exclusively, to techniques for characterizing the performance of such apparatus including those employed in the manufacture of integrated circuits.

2. Description of the Background Art

An object positioning apparatus may include a support member for supporting an object and a motion mechanism for moving the support member. To accurately position an object, the motion mechanism may include sensors that are coupled to a motion controller. The motion controller may read the sensors to get information relating to the support member, such as its current location, velocity, acceleration, and like information. For example, a motor driving the support member may include an encoder that is coupled to the motion controller. From the output signal of the encoder, the motion controller may determine how far the motor has driven the support member. Besides those related to motion, other factors that may affect accurate positioning of an object may also be monitored. For example, sensors for monitoring pressure, air flow, temperature, and other conditions may be coupled to a controller for data acquisition and control purposes.

In the manufacture of integrated circuits, for example, object positioning apparatus are employed to accurately position semiconductor wafers. Examples of such apparatus include those employed in photolithography tools. Generally speaking, a photolithography tool is a system for forming a pattern on a wafer. A photolithography tool typically includes an apparatus for positioning a wafer referred to as a "wafer stage", and an apparatus for positioning a mask referred to as a "mask stage". The mask has a pattern to be transferred on the wafer. The wafer is positioned under the mask, which is under a light source. By shining a light beam of suitable wavelength through the mask, the mask pattern is imprinted on a photosensitive material on the wafer.

Because of the precision involved in the manufacture of integrated circuits, photolithography tools employ accurate wafer and mask stages. As integrated circuits become more complex, the need for more accurate stages becomes greater. Thus, when a wafer or mask stage is incapable of accurate movement, the photolithography tool is taken "down" for troubleshooting. For example, a photolithography tool is taken down when unwanted vibrations on a wafer stage prevent accurate alignment of a wafer relative to a mask. Unfortunately, traditional techniques for troubleshooting positioning related problems take a relatively long time and are difficult to perform. One such troubleshooting technique involves turning off a component of the photolithography tool that may be generating too much vibration, running a pass/fail test and, if the test fails, turning off another component and re-running the pass/fail test. The just mentioned steps are performed until the source of the vibration is identified and repaired. Thus, if the photolithography tool has a lot of components or if the vibration is coming from more than one component, it will take some time before the photolithography tool can be brought back up to operational condition.

SUMMARY

In one embodiment, an object positioning apparatus is characterized by receiving sensor data from a sensor, processing the sensor data to compensate for sensor drift, and analyzing the resulting processed sensor data to determine a characteristic of the apparatus. Compensating for sensor drift cleans up the sensor data so that they may be properly analyzed and compared against known good sensor data, for example. Compared to conventional techniques, the present invention allows for more efficient troubleshooting of object positioning apparatus.

These and other features of the present invention will be readily apparent to persons of ordinary skill in the art upon reading the entirety of this disclosure, which includes the accompanying drawings and claims.

DESCRIPTION OF THE DRAWINGS

FIGS. 7A, 7B, 8A, 8B, 9A, and 9B show an example sequence further illustrating the flow diagram of FIG. 5.

FIG. 10 shows an example plot of frequency domain data of a bad photolithography tool.

The use of the same reference label in different drawings indicates the same or like components.

DETAILED DESCRIPTION

In the present disclosure, numerous specific details are provided such as examples of apparatus, components, and methods to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Moreover, embodiments of the present invention are described herein using a wafer stage and a mask stage in a photolithography tool as an example. It should be understood, however, that the present invention is not so limited and may be used to characterize object positioning apparatus in general.

Figure 1:
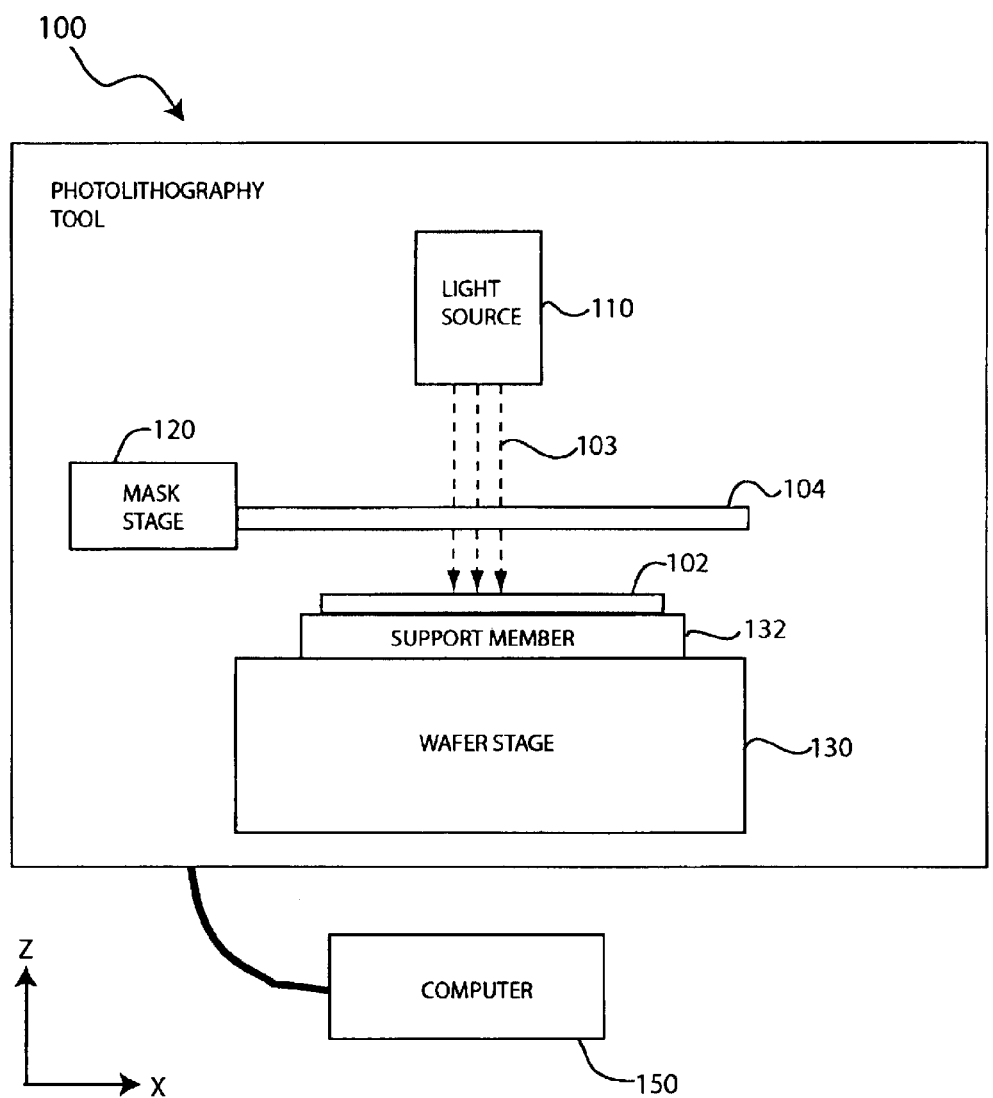
FIG. 1 shows a conventional photolithography tool.

Referring now to FIG. 1, there is shown a conventional photolithography tool 100. Tool 100 may be a commercially available photolithography tool such as those available from ASML of the Netherlands, for example. Tool 100 includes a support member 132 supporting a wafer 102. Support member 132 may be a vacuum chuck. Tool 100 also includes two object positioning apparatus. The first is referred to as a mask stage 120 while the other is referred to as a wafer stage 130. Mask stage 120 supports and positions a mask 104 (also referred to as a "reticle") containing a pattern to be imaged onto wafer 102. Wafer stage 130 positions support member 132 to position wafer 102 relative to mask 104. A light source 110 generates a light beam 103, which shines through mask 104 and onto wafer 102. Light beam 103 strikes portions of a photosensitive material on wafer 102 not blocked by the pattern on mask 104. This results in an image of the pattern being transferred on wafer 102.

Tool 100 may be a so-called "step and scan" lithography tool. In a step and scan tool, wafer 102 and mask 104 are positioned so that a portion of wafer 102 is exposed to light beam 103. After the exposure (i.e., the scanning), wafer 102 and mask 104 are positioned (i.e., stepped) to expose another portion of wafer 102. Mask stage 120 and wafer stage 130 may move in a straight line along the X-axis, Y-axis, or Z-axis and rotate about each of the aforementioned axes. For example, wafer stage 130 may move up and down along the Z-axis, left and right along the X-axis, and forward and backward along the Y-axis. In FIG. 1, the Y-axis goes into the plane defined by the Z-axis and the X-Axis.

Tool 100 includes a computer 150 for general operation of the tool and also for controlling the movement of mask stage 120 and wafer stage 130. Computer 150 may be a general purpose or special purpose computer, such as a motion controller, I/O processor, one or more computers networked together, or other types of data processing devices. Tool 100 may include position sensors (e.g., encoders) to monitor the motion of a stage in each of its axis of motion. The output of a position sensor may be continuously read by computer 150. The output of a position sensor and other sensors in tool 100 may be stored in memory, in a file on a data storage device, in a register, in a buffer, or in other data storage locations. Tool 100 may also include other types of sensors whose output may be read by computer 150. Examples of these sensors include those for pressure, air flow, vibration, temperature, and other conditions.

As can be appreciated, the positioning accuracy of wafer stage 130 and mask stage 120 may affect the quality of the image transferred on wafer 102. For example, unwanted vibrations coupled to wafer stage 130 or mask stage 120 may affect the quality of the transferred image. If the vibration is worse enough, focusing on wafer 102 may not be possible in the first place, thereby rendering tool 100 down. The plots of FIGS. 2 and 3 illustrate how a position error may affect the performance of tool 100.

Figure 2:
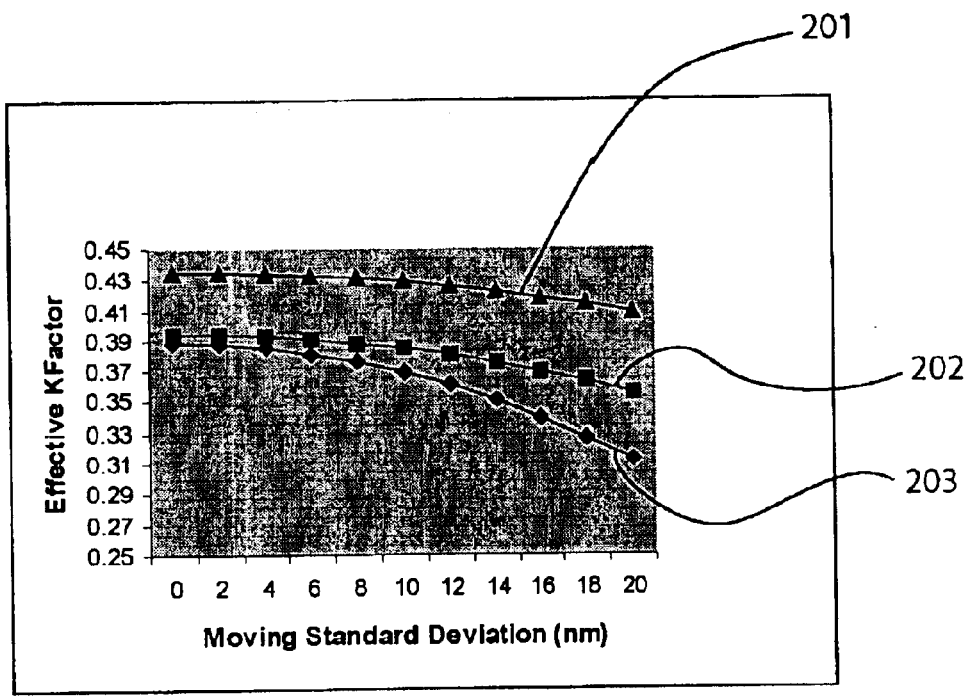
FIGS. 2 and 3 show plots illustrating how a position error may affect the performance of the tool shown in FIG. 1.
Figure 3:
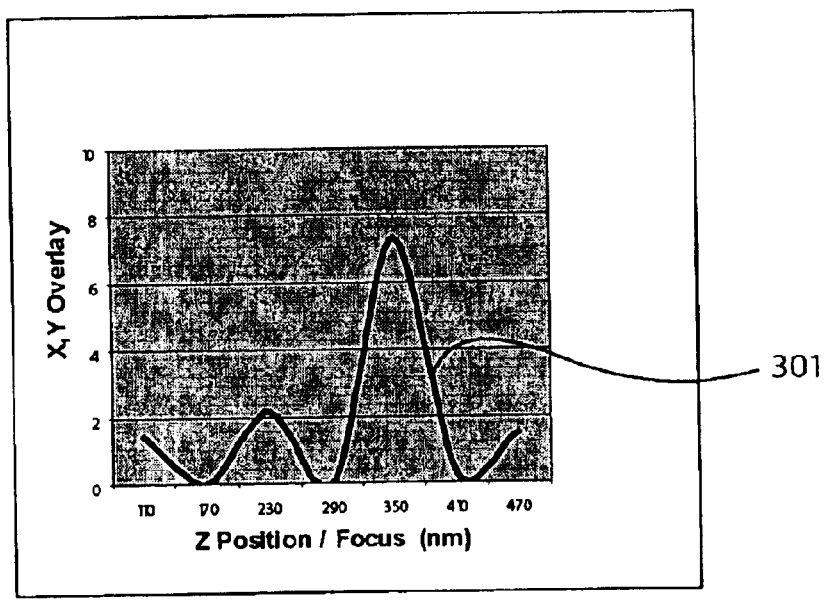

In FIG. 2, plots 201, 202, and 203 illustrate how the effective K-factor of a photolithography process is affected by errors in positioning wafer 102 and mask 104. A K-factor is a relative measure of the degree of difficulty of a photolithography process. The higher the K-factor, the more difficult the photolithography process. A K-factor may be derived from EQ. 1 below:

$$R = \frac{k_{factor}\lambda}{A} \qquad \text{EQ. 1}$$

where "R" is the resolution at which an optical system becomes diffraction limited, "$k_{factor}$" is the K-factor, "$\lambda$" is the wavelength of the light (e.g., light beam 103), and "A" is the numerical aperture of the optical system. Using FIG. 1 as an example, "A" would be the size of the lens (not shown) between wafer 102 and light source 110. Taking into account the moving standard deviation (MSD) of the difference between the position of wafer 104 and mask 104 as they are stepped and scanned, EQ. 1 may be re-written as shown in EQ. 2:

$$R = \frac{k_{factor}\lambda}{A} \frac{1}{1 - \frac{\pi^2}{2}\left(\frac{MSD}{R}\right)^2} \qquad \text{EQ. 2}$$

where "MSD" is the moving standard deviation. In FIG. 2, plot 201 is for a photolithography process with 180 nm resolution, plot 202 is for a photolithography process with 150 nm resolution, and plot 203 is for a photolithography process with 100 nm resolution. As is evident from FIG. 2, the higher the moving standard deviation, the lower the effective K-factor and therefore the more difficult the photolithography process. Also, the higher the resolution of the photolithography process, the more the moving standard deviation becomes critical. Both EQ. 1 and EQ. 2 are also described by Hans Butler, Richard George, and Jan Baselmans on page 10 of Microlithography World, Spring 1999 (a publication of Solid State Technology magazine).

In FIG. 3, plot 301 illustrates the effect of a Z-position error on the ability of a stage to position a wafer (or a mask) in the X-Y plane. Using FIG. 1 as an example, a Z-position error translates to an error in positioning wafer 102 along the Z-axis. The Z-position of a wafer is also referred to as "focus" because a wafer's position along the Z-axis affects the photolithography tool's ability to obtain focus on the wafer. As is evident from FIG. 3, an error in positioning a wafer along the Z-axis may affect the positioning of the wafer in the X-Y plane.

Figure 4:
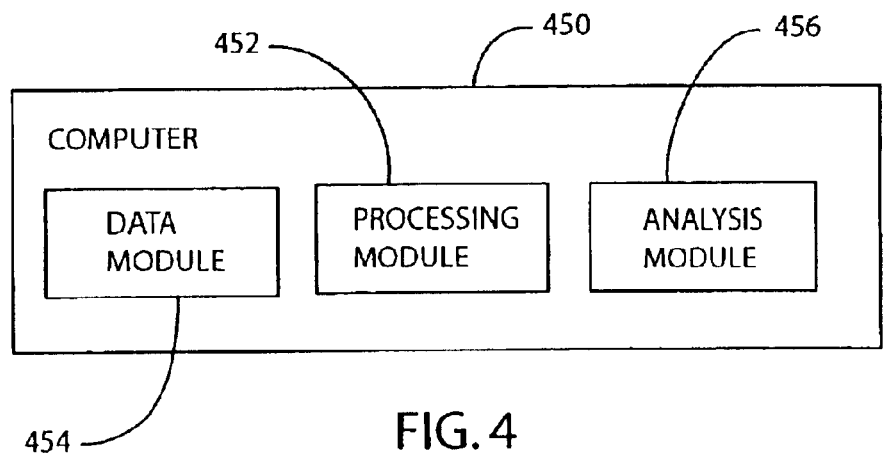
FIG. 4 schematically shows a computer for characterizing an object positioning apparatus in accordance with an embodiment of the present invention.

FIG. 4 schematically shows a computer 450 for characterizing an object positioning apparatus in accordance with an embodiment of the present invention. Computer 450 includes the following components: a processing module 452, a data module 454, and an analysis module 456. Other components of computer 450 (e.g., memory, processor, storage device, keyboard, display, add-on cards, ...) are not shown for clarity of illustration. In one embodiment, the components of computer 450 shown in FIG. 4 are implemented in software. As can be appreciated, the components of computer 450 may also be implemented in hardware or combination of hardware and software (e.g., firmware). One or more components of computer 450 may be combined into a single module or integrated in a system for manufacturing an integrated circuit. For example, computer 150 shown in FIG. 1 may include a processing module 452, a data module 454, and an analysis module 456 in accordance with an embodiment of the present invention.

Data module 454 may contain data (hereinafter "sensor data") obtained from a sensor of an object positioning apparatus. Data module 454 may be a file, a memory location, a storage device location, a smart card, or other data storage location. In one embodiment, data module 454 is a text file containing sensor data obtained from a position sensor of a stage (i.e., mask stage 120 or wafer stage 130) of tool 100. For example, computer 150 may populate data module 454 as computer 150 reads the output of a position sensor. Data module 454 may be obtained from computer 150 by copying it to a removable storage device (e.g., floppy disk) or transferring it over a network coupling computer 150 and computer 450, for example.

Processing module 452 may include computer-readable program code for reading sensor data contained in a data module 454 and processing the sensor data to compensate for sensor drift. In one embodiment, processing module 452 includes an electronic spreadsheet (e.g., Microsoft Excel™ spreadsheet) configured to import sensor data from a data module 454, remove the slope of the sensor data, and optionally remove the intercept of the sensor data.

Analysis module 456 may include computer-readable program code for analyzing the output of processing module 452. Analysis module 456 may transform the output of processing module 452 to frequency domain and integrate (i.e., sum) the resulting frequency domain data over a range of frequencies. Analysis module 456 may also plot the frequency domain data. In one embodiment, analysis module 456 includes a math software package (e.g., Mathematica™ math software package) configured to take the Fast Fourier Transform (FFT) of the output of processing module 452. Analysis module 456 may also include an electronic spreadsheet configured to integrate the frequency domain data over a range of frequencies. The electronic spreadsheet may also be configured to plot the frequency domain data.

Figure 5:
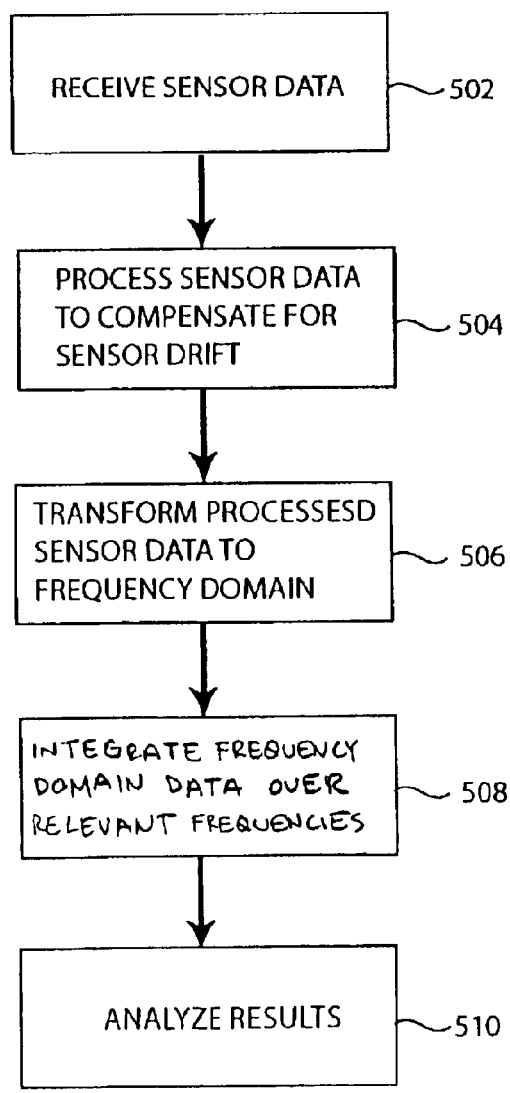
FIG. 5 shows a flow diagram of a method of characterizing an object positioning apparatus in accordance with an embodiment of the present invention.

FIG. 5 shows a flow diagram of a method of characterizing an object positioning apparatus in accordance with an embodiment of the present invention. In step 502, sensor data are received in computer 450 (or computer 150). The sensor data may be from sensors for monitoring an object positioning apparatus such as a wafer stage. The sensor data may be in a data module 454 transferred from a computer 150 to a computer 450 over a network, for example.

In step 504, the sensor data are processed to compensate for sensor drift. Sensor data that have been processed to compensate for sensor drift are hereinafter referred to as "processed sensor data." A sensor may drift over time due to several factors including ambient temperature, heating of the sensor, sensor usage, and varying electric current to the sensor, for example. The inventor has discovered that sensor drift may make it difficult to analyze sensor data and, in some cases, may make sensor data useless for characterizing an object positioning apparatus. For example, if the vibration characteristics of a wafer stage is being investigated, sensor drift may saturate the low frequency portion of sensor data such that any component of the wafer stage that is known to generate low frequency vibration will become suspect regardless of whether it is actually generating too much low frequency vibration. By compensating for sensor drift, sensor data are cleaned up such that they may be properly analyzed and compared to known good sensor data. A specific example of a method of processing sensor data to compensate for sensor drift is later described in connection with FIG. 6.

Continuing in step 506, processed sensor data from step 504 may be transformed to frequency domain. Processed sensor data that have been transformed to frequency domain are hereinafter referred to as "frequency domain data". Frequency domain data allow for more convenient analysis of frequency related characteristics such as vibration, for example. In one embodiment, processed sensor data may be transformed to frequency domain using Fourier Transform including Fast Fourier Transform. Using the Mathematica™ math software package as an example, sensor data may be transformed to frequency domain data using the function given by EQ. 3:

Fourier[sensor data]  EQ. 3

Depending on the application, the resulting frequency domain data may be analyzed at this time by comparing them to another frequency domain data. For example, steps 502–506 may be performed on a known good photolithography tool referred to as a "good tool" and on a photolithography tool being investigated referred to as a "bad tool". The resulting frequency domain data for both the good tool and the bad tool may then be plotted and compared to find areas of discrepancy. For example, if the plots for the bad and good tools are the same except around a certain frequency, a component of the bad tool that is known to generate that frequency may be investigated.

It is to be noted that vibration frequencies generated by components of an object positioning apparatus may be determined during the design of the apparatus, by experimentation, or from its operation and maintenance history, for example. Vibration frequencies generated by components of an object positioning apparatus may also be obtained from its manufacturer. For example, a photolithography tool manufacturer may supply its customers a list of components and their respective vibration frequencies. An example list of components for a wafer stage with their corresponding vibration frequencies is shown in Table. 1.

TABLE 1

| Frequency | Component |
|---|---|
| 1–3 Hz | Natural Frequency of the tool |
| 10–15 Hz | Subsystem 1 |
| 18–23 Hz | Subsystem 2 |
| 48 Hz | Subsystem 3 |
| 56 Hz | Subsystem 4 |
| 75 Hz | Subsystem 5 |
| ... | ... |

In the example of Table 1, subsystems 1, 2, 3, etc. are components of the photolithography tool. Examples of such subsystems include stepper and linear motors, chucks, cooling fins, lens, and like components. As shown in Table 1, 1–3 Hz are the vibration frequencies of a photolithography tool when it is not processing a wafer, 10–15 Hz are attributable to subsystem 1, 18–23 Hz are attributable to subsystem 2, 48 Hz is attributable to subsystem 3, 56 Hz is attributable to subsystem 4, 75 Hz is attributable to subsystem 5, and so on.

Continuing in step 508, frequency domain data obtained from step 506 may be integrated over a range of relevant frequencies to analyze a component of an object positioning apparatus. Using the example of Table 1, frequency domain data may be integrated from 10 Hz to 15 Hz to analyze subsystem 1. The integration may also be performed from 7 Hz to 18 Hz (i.e., add +/-3 Hz if there are no adjacent frequencies) to better capture the relevant frequencies. The result of the integration may then be compared to that of a known good tool. For example, if integrating frequency domain data of a bad tool from 10 Hz to 15 Hz results in a value of 0.3 whereas frequency domain data of a good tool would give a value of 0.06 over the same frequency range, the subsystem 1 of the bad tool may be generating too much vibration and may be contributing to a position error.

In step 510, the results obtained from step 506 or step 508 may be analyzed by comparing them to another result. For example, the results obtained from step 506 may be plotted and then compared to a known good set of plots or compared to a list of known vibration frequencies (e.g., Table 1).

Figure 6:
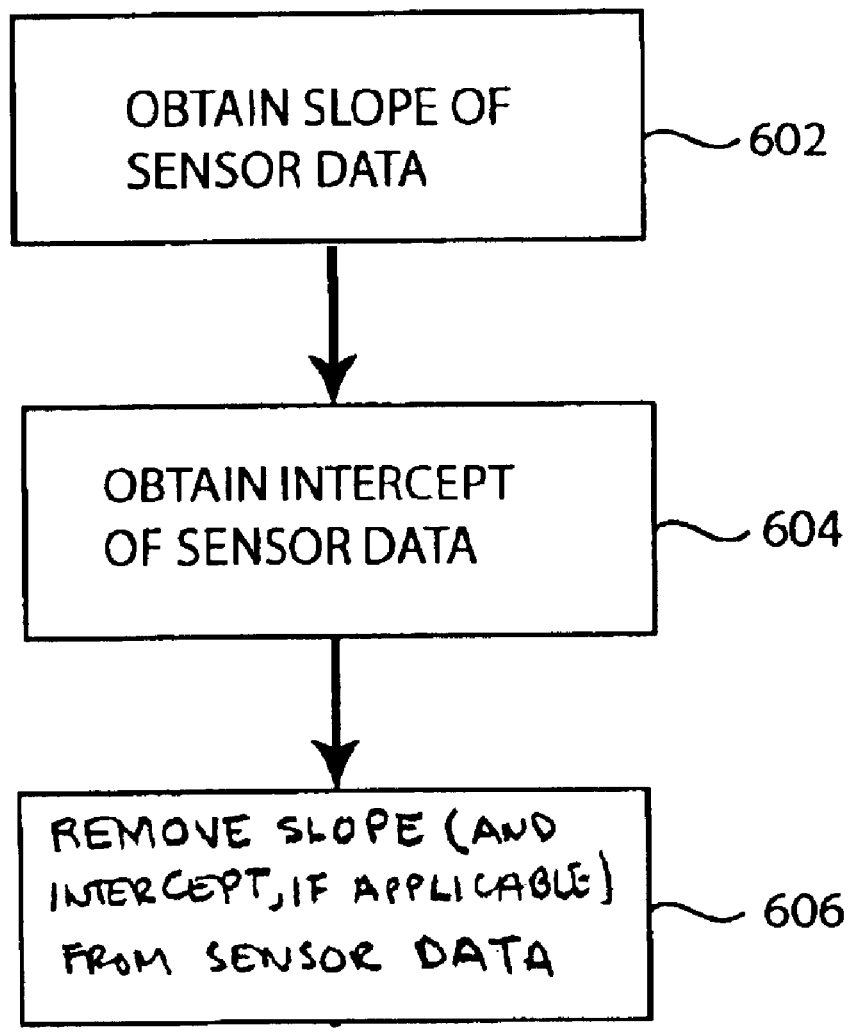
FIG. 6 shows a flow diagram of a method of compensating for sensor drift in accordance with an embodiment of the present invention.

Referring now to FIG. 6, there is shown a flow diagram of a method of compensating for sensor drift in accordance with an embodiment of the present invention. In step 602, a slope of sensor data is obtained. Using the Microsoft Excel™ spreadsheet as an example, a slope of sensor data may be obtained using the formula shown below as EQ. 4:

=Slope(sensor data, data point number)  EQ. 4 where "sensor data" is a range of cells with sensor values and "data point number" is a range of cells with numerical identification for each sensor value. Table 2 shows an example list of data point numbers with their corresponding sensor data.

TABLE 2

| Data Point No. | Sensor Data |
|---|---|
| 1 | 3.2 |
| 2 | 1.2 |

TABLE 2-continued

| Data Point No. | Sensor Data |
|---|---|
| 3 | 1.1 |
| 4 | 2.4 |
| ... | ... |

In step 604, an intercept of sensor data is optionally obtained. The intercept of the sensor data may be removed from each data point to normalize the sensor data, making the resulting processed sensor data more suitable for analysis. The step of obtaining an intercept of sensor data may be omitted in applications where the intercept does not obscure the sensor data. Using the Microsoft Excel™ spreadsheet as an example, an intercept of sensor data may be obtained using the formula shown below as EQ. 5:

=Intercept(sensor data, data point number)   EQ. 5 where "sensor data" is a range of cells with sensor values and "data point number" is a range of cells with numerical identification for each sensor value.

In step 606, the slope and, optionally, the intercept are removed from the sensor data, thus generating processed sensor data. Step 606 may be performed by removing the slope and the intercept from each data point. Step 606 may be performed as follows:

```
ProcessedSensorData(1) = SensorData(1) – [1 * Slope + Intercept]
ProcessedSensorData(2) = SensorData(2) – [2 * Slope + Intercept]
    ...
ProcessedSensorData(N) = SensorData(N) – [N * Slope + Intercept]
``` where "N" is the number of data points (i.e., number of sensor values) in the sensor data, "SensorData" is a sensor value in the sensor data, "Slope" is the slope of the sensor data, and "Intercept" is the intercept of the sensor data. The resulting processed sensor data may comprise several data points with corresponding processed sensor values.

Figure 7A:
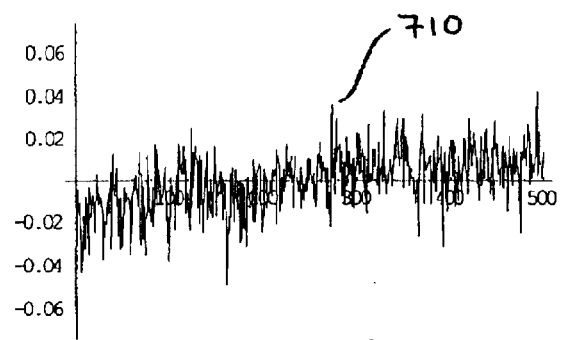

An example sequence further illustrating the flow diagram of FIG. 5 is now described with reference to FIGS. 7–10. FIG. 7A shows sensor data 700 from a Z-position sensor. In FIG. 7A, column 703 lists sensor values from the Z-position sensor while the corresponding data point number for each sensor value is listed in column 701. For example, the first data point in FIG. 7A referred to as "data point 1" has a sensor value of –0.031, the second data point has a sensor value of –0.004, etc. Sensor data 700 may be from a Z-position sensor of a wafer stage of a photolithography tool (e.g., tool 100 of FIG. 1). Thus, sensor data 700 may represent the vertical positions of a wafer relative to a light source. For example, "data point 1" may represent the Z-position of a wafer stage at a first moment in time, "data point 2" may represent the Z-position of a wafer stage at a second moment in time, etc. Note that not all data points are shown in FIGS. 7–10 for clarity of illustration.

FIG. 7B shows a plot 710 of sensor data 700. In FIG. 7B, the vertical axis represents the sensor values listed in column 703 whereas the horizontal axis represents the data points listed in column 701.

Figures 8A, 8B:
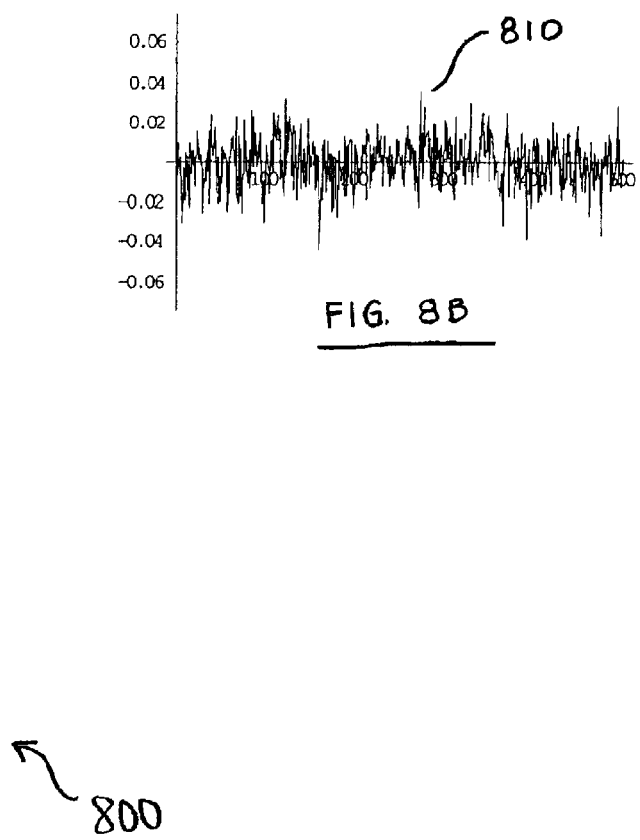

FIG. 8A shows processed sensor data 800, which are the result of processing sensor data 700 to compensate for sensor drift. Processed sensor data 800 comprise a set of data points listed in column 801 and corresponding processed sensor values listed in column 803. In the example of FIG. 8A, sensor data 800 have been processed in accordance with the flow diagram of FIG. 6. That is, the slope and intercept of sensor data 700 have been removed to generate processed sensor data 800. Data point 1 of processed sensor data 800 is a processed version of data point 1 of sensor data 700, data point 2 of processed sensor data 800 is a processed version of data point 2 of sensor data 700, etc.

FIG. 8B shows a plot 810 of processed sensor data 800. In FIG. 8B, the vertical axis represents the processed sensor values listed in column 803 whereas the horizontal axis represents the data points listed in column 801.

FIG. 9A shows frequency domain data 900, which are the result of transforming processed sensor data 800 to frequency domain. In FIG. 9A, processed sensor data 800 was transformed to frequency domain by Fast Fourier Transform (FFT). In FIG. 9A, column 903 lists the FFT values for frequencies listed in column 901. For example, the FFT value at 1 Hz is 0.0211944, the FFT value at 2 Hz is 0.0285264, etc.

FIG. 9B shows a plot 910 of frequency domain data 900. In FIG. 9B, the vertical axis represents the FFT values listed in column 903 while the horizontal axis represents the frequencies listed in column 901. Note that because frequency domain data 900 only go up to 250 Hz in this example, plot 910 shows a mirror-image after 250 Hz.

Plot 910 was obtained using sensor data from a good tool. For comparison purposes, sensor data from a bad tool was similarly processed, transformed to frequency domain, and then plotted as shown in FIG. 10 (see plot 1020). Comparing plot 910 to plot 1020 of FIG. 10 identifies a discrepancy around 20 Hz and 120 Hz. This information may then be used to identify components that may be generating vibrations at these frequencies. Using Table 1 as an example, subsystem 1 in the bad tool may be causing inaccuracies in the Z-position because that subsystem generates 10–15 Hz vibrations and vibrations around those frequencies are relatively large compared to that in a good tool. Subsystem 2, which generates frequencies between 18–23 Hz, may also be causing inaccuracies in the Z-position. Another component (not listed in Table 1) in the bad tool that is known to generate vibration around 120 Hz may also be generating too much vibration. The frequency domain data of the good tool and the bad tool may also be integrated over a range of relevant frequencies (e.g., between 10 Hz to 15 Hz for subsystem 1) to better analyze a particular component.

While specific embodiments of the present invention have been provided, it is to be understood that these embodiments are for illustration purposes and not limiting. Many additional embodiments will be apparent to persons of ordinary skill in the art reading this disclosure. Thus, the present invention is limited only by the following claims.

What is claimed is:

1. A method of characterizing an object positioning apparatus, the method comprising:

receiving sensor data;

processing the sensor data to compensate for sensor drift and generate processed sensor data; and analyzing the processed sensor data to identify a failing component of the object positioning apparatus.

2. The method of claim 1 wherein processing the sensor data comprises:

removing a slope of the sensor data to generate slope-removed data.

3. The method of claim 1 wherein processing the sensor data comprises:

obtaining a slope of the sensor data;

obtaining an intercept of the sensor data; and removing the slope and the intercept from the sensor data to generate slope-removed data.

4. The method of claim 1 wherein receiving the sensor data comprises:

receiving a data file containing the sensor data.

5. The method of claim 1 wherein the characteristic is related to vibration on the object positioning apparatus.

6. The method of claim 1 wherein the object positioning apparatus is part of a system for manufacturing an integrated circuit.

7. The method of claim 1 wherein the object positioning apparatus positions a semiconductor wafer.

8. The method of claim 1 wherein the object positioning apparatus positions a mask.

9. The method of claim 1 wherein the sensor data are from a position sensor of the object positioning apparatus.

10. A system for characterizing an object positioning apparatus, the system comprising:

a data module containing sensor data from a sensor;

a processing module configured to process the sensor data to compensate for sensor drift and generate processed sensor data; and an analysis module configured to allow for identification of a failing component of the object positioning apparatus based on the processed sensor data.

11. The system of claim 10 wherein the sensor data comprise position data of the object positioning apparatus.

12. The system of claim 10 wherein the processing module is in a system for manufacturing an integrated circuit.

13. The system of claim 10 wherein the object positioning apparatus positions a wafer.

14. The system of claim 10 wherein the object positioning apparatus positions a mask.

15. A system comprising:

means for receiving information from a sensor;

means for processing the information to compensate for sensor drift; and means for analyzing the processed information to determine a failing component of an object positioning apparatus.

16. The system of claim 15 wherein the object positioning apparatus is part of a system for manufacturing an integrated circuit.

17. The system of claim 15 wherein the object positioning apparatus comprises a wafer stage in a photolithography tool.

18. The system of claim 15 wherein the object positioning apparatus comprises a mask stage in a photolithography tool.

19. A method of characterizing an object positioning apparatus, the method comprising:

receiving sensor data;

removing a slope of the sensor data to compensate for sensor drift and to generate slope-removed data;

transforming the slope-removed data from time domain to frequency domain to generate frequency domain data; and integrating the frequency domain data over a range of frequencies to determine a characteristic of the object positioning apparatus.

20. The method of claim 19 wherein transforming the slope-removed data to frequency domain comprises taking a Fourier Transform of the slope-removed data.

* * * * *

UNITED STATES PATENT AND TRADEMARK OFFICE
CERTIFICATE OF CORRECTION

PATENT NO. : 6,753,944 B1
DATED : June 22, 2004
INVENTOR(S) : Jonathan F. Dajnowicz It is certified that error appears in the above-identified patent and that said Letters Patent is hereby corrected as shown below:

<u>Column 10,</u>
Line 34, add the following claims:
-- 21. The method of claim 19 further comprising comparing a result of integrating the frequency domain to known good sensor data.

22. The method of claim 1 wherein analyzing the processed sensor data comprises converting the processed sensor data from time domain to frequency domain.

23. The method of claim 1 wherein analyzing the processed sensor data comprises comparing the processed sensor data to known good sensor data. --

Signed and Sealed this

Eighth Day of February, 2005

JON W. DUDAS
*Director of the United States Patent and Trademark Office*